(12) United States Patent
Bertsch et al.

(10) Patent No.: US 7,980,270 B2
(45) Date of Patent: Jul. 19, 2011

(54) SPOOL VALVE APPARATUS AND METHOD

(75) Inventors: Paul H. Bertsch, Huntington Beach, CA (US); Christopher J. Taylor-McCune, Mission Viejo, CA (US); Christopher H. Verdugo, Yorba Linda, CA (US)

(73) Assignee: SHURflo, LLC, Cypress, CA (US)

( * ) Notice: Subject to any disclaimer, the term of this patent is extended or adjusted under 35 U.S.C. 154(b) by 0 days.

(21) Appl. No.: 11/127,796

(22) Filed: May 12, 2005

(65) Prior Publication Data

US 2006/0254657 A1 Nov. 16, 2006

(51) Int. Cl.
*F16K 11/07* (2006.01)

(52) U.S. Cl. ............... 137/625.69; 137/625.68; 91/342; 91/350

(58) Field of Classification Search ............ 137/625.69, 137/625.68; 91/303, 341 R, 342, 350
See application file for complete search history.

(56) References Cited

U.S. PATENT DOCUMENTS

| | | | | |
|---|---|---|---|---|
| 923,486 A * | 6/1909 | Bowen | ............................ | 91/309 |
| 1,036,630 A * | 8/1912 | Irwin | ............................ | 91/342 |
| 1,665,046 A * | 4/1928 | Tucker | ............................ | 91/235 |
| 2,361,757 A * | 10/1944 | Fink | ............................ | 91/312 |
| 2,477,359 A * | 7/1949 | Barksdale | ............................ | 91/342 |
| 2,631,571 A * | 3/1953 | Parker | ............................ | 137/625.68 |
| 2,707,456 A * | 5/1955 | Schweisthal | ............................ | 91/268 |
| 2,887,127 A | 5/1959 | Broadbent | | |
| 2,910,081 A * | 10/1959 | Karbowniczek | ............................ | 137/625.68 |
| 2,920,650 A * | 1/1960 | Moog, Jr. | ............................ | 137/625.69 |
| 2,920,652 A | 1/1960 | Rudelick et al. | | |
| 3,017,901 A * | 1/1962 | Hicks, Jr. | ............................ | 251/331 |
| 3,083,731 A * | 4/1963 | Hasbany | ............................ | 137/625.68 |
| 3,354,912 A * | 11/1967 | Gordon et al. | ............................ | 137/625.69 |
| 3,504,707 A * | 4/1970 | Brooks | ............................ | 137/625.66 |
| 3,516,442 A * | 6/1970 | Munroe | ............................ | 137/625.66 |
| 3,516,444 A * | 6/1970 | Peck | ............................ | 137/625.69 |
| 3,565,115 A * | 2/1971 | Beckett et al. | ............................ | 137/625.69 |
| 3,667,504 A * | 6/1972 | Wittren et al. | ............................ | 137/625.69 |
| 3,819,152 A | 6/1974 | Clippard, III | | |
| 3,976,103 A | 8/1976 | Ostic | | |
| 4,008,984 A | 2/1977 | Scholle | | |
| 4,021,016 A | 5/1977 | Hart | | |
| 4,060,099 A | 11/1977 | Bates | | |
| 4,418,711 A | 12/1983 | Stoll et al. | | |
| 4,491,155 A | 1/1985 | Meyer et al. | | |
| 4,515,184 A | 5/1985 | Bownass et al. | | |
| 4,524,803 A * | 6/1985 | Stoll et al. | ............................ | 137/625.64 |
| 4,540,349 A | 9/1985 | Du | | |
| 4,610,192 A | 9/1986 | Hartley et al. | | |
| 5,095,949 A * | 3/1992 | Day | ............................ | 137/625.69 |
| 5,337,787 A | 8/1994 | Fiondella | | |
| 5,470,209 A | 11/1995 | Hartley et al. | | |
| 5,505,593 A | 4/1996 | Hartley et al. | | |
| 5,554,011 A * | 9/1996 | Bales et al. | ............................ | 91/341 R |
| 5,664,940 A | 9/1997 | Du | | |
| 6,305,418 B1 | 10/2001 | Schulze | | |

(Continued)

*Primary Examiner* — Stephen M Hepperle
*Assistant Examiner* — Craig Price
(74) *Attorney, Agent, or Firm* — Quarles & Brady LLP (57) ABSTRACT

Some embodiments of the present invention provide a spool valve having a spool axially movable within a sleeve of two or more stacked rings having projections extending therebetween. One or more seals on the spool can slide across surfaces of the stacked rings in movement of the spool to different positions corresponding to different states of the valve. In some embodiments, one or more of the stacked rings can have projections extending toward and contacting an adjacent ring of the sleeve, thereby maintaining desired axial positions of the rings relative to one another while providing apertures through which fluid can flow and supporting surfaces for each seal as it slides from one ring to another.

12 Claims, 8 Drawing Sheets

U.S. PATENT DOCUMENTS

| | | | |
|---|---|---|---|
| 6,382,934 B2 * | 5/2002 | Budde | 91/345 |
| 6,402,944 B1 * | 6/2002 | Vaughan | 137/625.69 |
| 6,976,506 B2 * | 12/2005 | Towne et al. | 137/625.69 |
| 7,191,799 B2 * | 3/2007 | Towne et al. | 137/625.69 |

* cited by examiner

SPOOL VALVE APPARATUS AND METHOD

BACKGROUND OF THE INVENTION

Spool valves are commonly used in a wide variety of applications, and typically have a spool movable within a housing to different positions along an axis in order to control fluid flow through the valve. Fluid is normally supplied to and exhausted from locations between the spool and the housing. By moving the spool with respect to the housing, fluid can be supplied to different locations between the spool and the housing, thereby changing the locations from which fluid is drawn into the valve and/or locations to which fluid is supplied by the valve.

Demand continues to increase for spool valves that are more reliable, have a longer service life, are less expensive to manufacture and install, are readily adaptable to different applications, and are well suited for a number of different operating conditions (e.g., higher fluid pressures, faster switching speeds, and the like). New spool valves and spool valve components offering any of these features would therefore be welcome in the art.

SUMMARY OF THE INVENTION

Some embodiments of the present invention provide a spool valve, comprising first and second stacked rings through which an axis passes, the first and second rings each comprising a plurality of projections extending toward the second and first rings, respectively; a spool movable along the axis, the spool having a first position in which fluid moves through the valve in a first manner; and a second position in which fluid moves through the valve in a second manner different than the first manner; and a chamber located between the spool and at least one of the rings, the chamber having first and second axially disposed positions with respect to the rings, wherein each of the first and second rings defines a wall of the chamber in at least one of the first and second positions of the chamber.

In some embodiments, a spool valve is provided, and comprises first and second stacked rings through which an axis passes; a plurality of projections extending from the first ring toward the second ring, each of the plurality of projections comprising a base and a tip having a smaller cross-sectional area than the base; a spool movable along the axis, the spool having a first position in which fluid moves through the valve in a first manner; and a second position in which fluid moves through the valve in a second manner different than the first manner; and a chamber located between the spool and at least one of the rings, the chamber having first and second axially disposed positions with respect to the rings, wherein each of the first and second rings defines a wall of the chamber in at least one of the first and second positions of the chamber.

Some embodiments of the present invention provide a method of changing states of a spool valve having a spool movable within a sleeve, wherein the method comprises actuating the spool to move along an axis extending through the sleeve; moving a chamber of the spool valve from a first position with respect to the sleeve to a second position with respect to the sleeve; moving a seal on the spool valve at least partially across an interface between first and second stacked rings of the sleeve; and supporting the seal with at least one projection extending from each of the first and second rings toward the second and first rings, respectively.

Further aspects of the present invention, together with the organization and operation thereof, will become apparent from the following detailed description of the invention when taken in conjunction with the accompanying drawings, wherein like elements have like numerals throughout the drawings.

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. The use of "including," "comprising," or "having" and variations thereof herein is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

A pump having a spool valve according to the present invention is illustrated in FIGS. 1-5, and is indicated generally at 10. The pump 10 is a gas operated pump (i.e., driven by a source of air or other gas or combination of gases under pressure), and is used to pump fluid of any type. The pump 10 has a fluid inlet 12 into which fluid to be pumped is drawn, a fluid outlet 14 through which pumped fluid exits the pump 10, a gas inlet 16 through which driving gas under pressure enters the pump 10, and a gas outlet 18 through which gas is exhausted from the pump 10. The inlets 12, 16 and outlets 14, 18 can have any type of fluid fitting desired, including without limitation compression, John Guest®, threaded, soldered, and other types of fittings. The inlets 12, 16 and outlets 14, 18 are conventional in nature and are not therefore described further herein.

Figure 1:
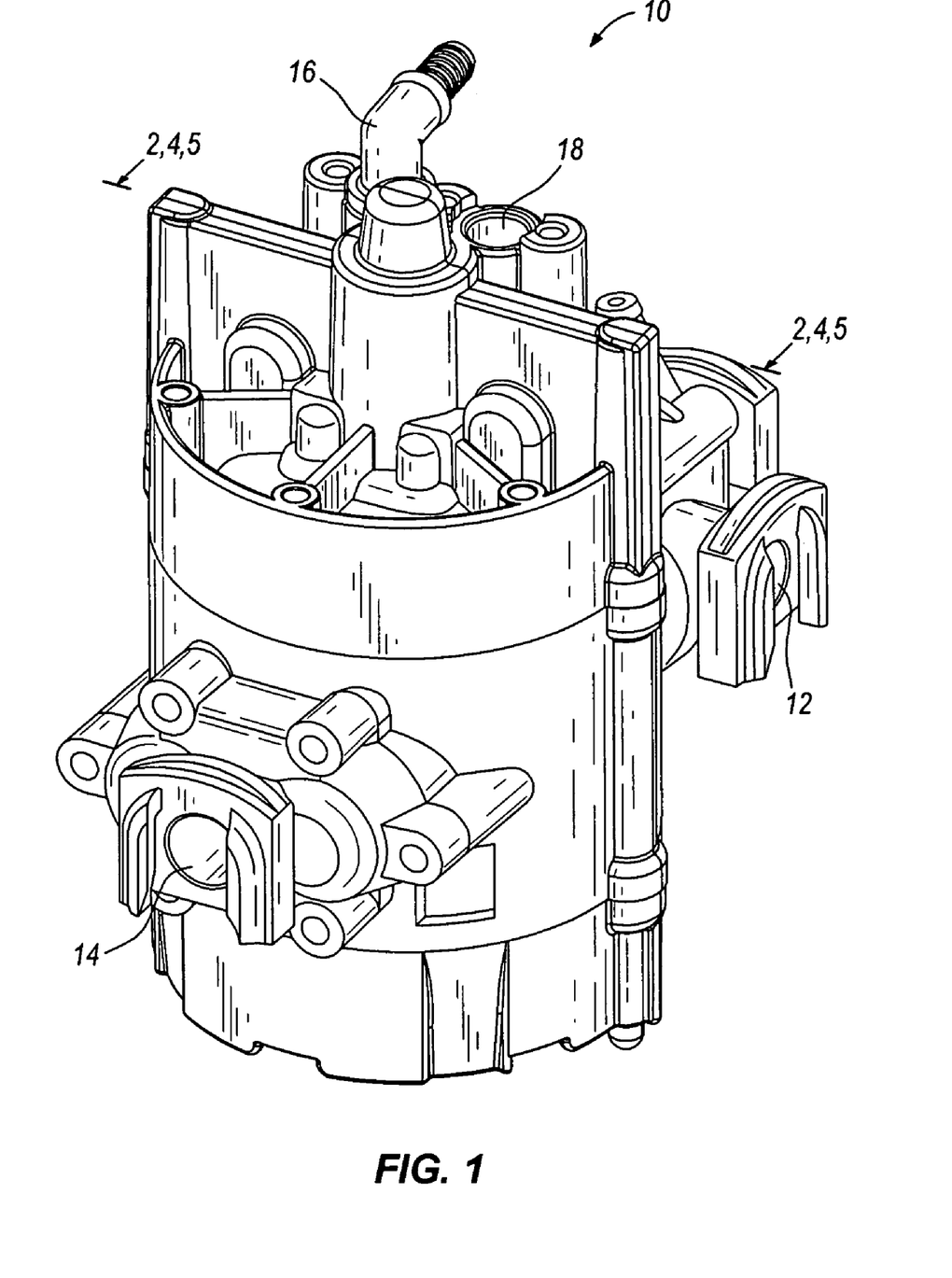
FIG. 1 is a perspective view of a pump according to an embodiment of the present invention.
Figure 2:
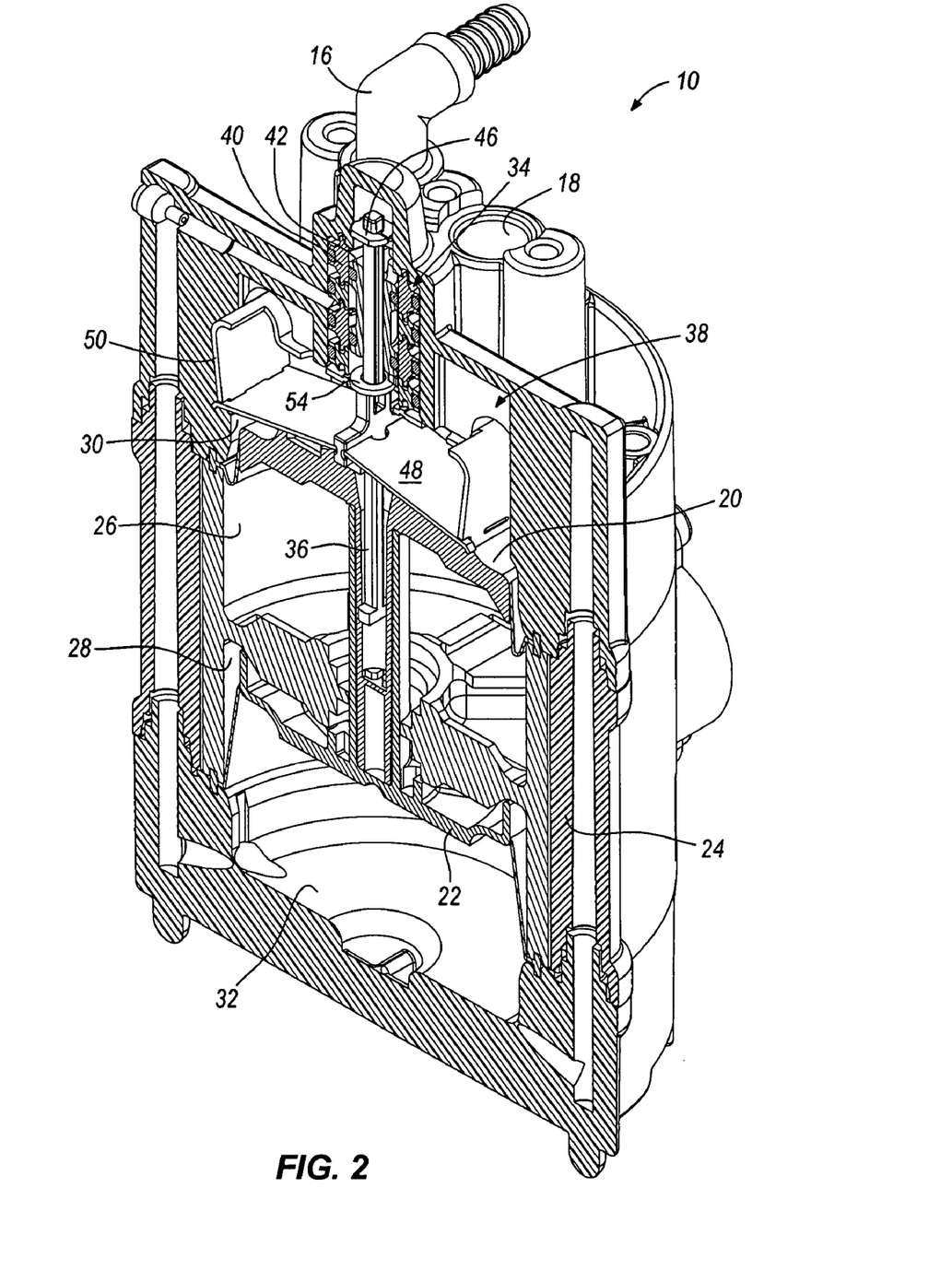
FIG. 2 is a perspective partial cross-sectional view of the pump illustrated in FIG. 1, taken along lines 2-2 of FIG. 1.
Figure 3:
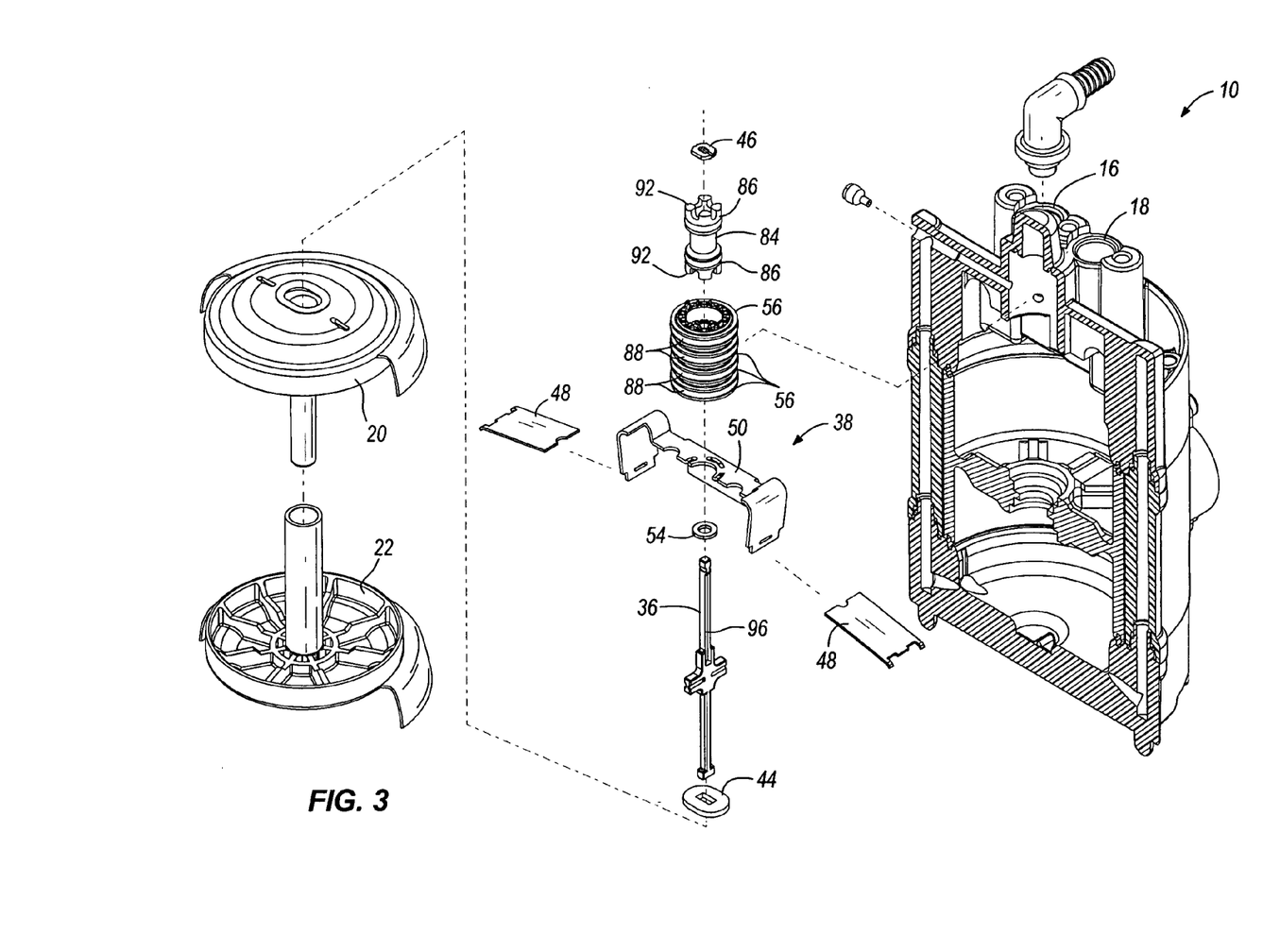
FIG. 3 is an exploded perspective partial cross-sectional view of the pump illustrated in FIG. 2.

As shown in FIGS. 2 and 3, the pump 10 is a double piston pump, and has first and second pistons 20, 22 movable axially within a housing 24 to draw fluid into the pump 10 and to push fluid from the pump 10 as the pistons 20, 22 are driven in an axially reciprocating manner within the housing 24. As the first and second pistons 20, 22 are driven in a upward direction (with reference to the orientation of the pump 10 illustrated in FIGS. 1-5), fluid is drawn into the fluid inlet 12 and into a first driven chamber 26 in the housing 24 by the first piston 20, and is pushed out of a second driven chamber 28 in the housing 24 and out of the fluid outlet 14 by the second piston 22. As the first and second pistons 20, 22 are driven in an downward direction (also with reference to the orientation of the pump 10 illustrated in FIGS. 1-5), fluid is drawn into the fluid inlet 12 and into the second fluid chamber 28 in the housing 24 by the second piston 22, and is pushed out of the first fluid chamber 26 in the housing 24 and out of the fluid outlet 14 by the first piston 20.

To drive the pistons 20, 22, pressurized air or other fluid is supplied to first and second driving chambers 30, 32 on opposite sides of the pistons 20, 22 from the first and second driven chambers 26, 28. To drive the pistons 20, 22 in the downward direction described above, pressurized fluid is supplied to the first driving chamber 30 via the gas inlet 16 while fluid in the second driving chamber 32 is permitted to evacuate through the gas outlet 18. To drive the pistons 20, 22 in the upward direction described above, pressurized fluid is supplied to the second driving chamber 32 via the gas inlet 16 while fluid in the first driving chamber 30 is permitted to evacuate through the gas outlet 18.

With continued reference to FIGS. 2-5, a spool valve 34 is used to control the supply and exhaust of fluid driving the pistons 20, 22. The spool valve 34 comprises a sleeve 40 and a spool 42 movable within the sleeve 40, and is described in greater detail below. In a first position (illustrated in FIG. 4), the spool valve 34 supplies pressurized driving fluid to the first driving chamber 30, thereby forcing the pistons 20, 22 in a downward direction as described above. Also in the first position, the spool valve 34 vents fluid in the second driving chamber 32 to the gas outlet 18. In a second position (illustrated in FIG. 5), the spool valve 34 supplies pressurized driving fluid to the second driving chamber 32, thereby forcing the pistons 20, 22 in an upward direction as also described above. Also in the second position, the spool valve 34 vents fluid in the first driving chamber 30 to the gas outlet 18.

Upon reaching an upward or downward limit, the spool valve 34 is automatically switched between the two spool valve positions described above. In some embodiments, this switch can be generated by a piston rod 36 and spring assembly 38 in a manner similar to that disclosed in U.S. Pat. No. 5,505,593 issued to Hartley et al., the entire contents of which are incorporated herein by reference insofar as they relate to devices and elements for controlling and switching valves. With the exception of mutually inconsistent features and elements disclosed herein and in the Hartley patent, reference is hereby made to the Hartley patent for a more complete understanding of the piston rod 36, spring assembly 38, and their construction and operation.

In the illustrated embodiment of FIGS. 1-9, the pistons 20, 22 are coupled to the piston rod 36 via a lost motion connection. When the spool 42 of the spool valve 34 is in the first position described above and shown in FIG. 4, the pistons 20, 22 move in a downward direction until a stop 44 on or coupled to either or both pistons 20, 22 pulls the piston rod 36 in a downward direction, thereby pushing a stop 46 on the piston rod 36 against the spool 42 of the spool valve 34. In this manner, the spool 42 is moved to the second position described above and shown in FIG. 5.

When the spool 42 of the spool valve 34 is in the second position described above and shown in FIG. 5, the pistons 20, 22 move in an upward direction until the stop 44 pushes the piston rod 36 in an upward direction, thereby pushing a stop 54 on the piston rod 36 against the spool 42 of the spool valve 34. In this manner, the spool 42 is moved to the first position described above and shown in FIG. 4. In other embodiments, different stops on or coupled to either or both pistons 20, 22 can be used to move the piston rod 36.

As described above, some embodiments of the present invention have a spring assembly 38 operable to switch the spool valve 34 between states. Although a spring assembly 38 is not required in all embodiments of the pump 10, the spring assembly 38 can provide force to at least assist in moving the spool 42 between the first and second positions described above. Any suitable spring assembly 38 can be coupled to the spool 42 for providing such force, and in some embodiments (e.g., the embodiment of FIGS. 1-9) can be coupled to the spool 42 via the piston rod 36. As an alternative to a spring assembly 38, any other energy storage mechanism can be utilized in order to provide the same or similar piston rod biasing functions described herein.

In some embodiments, the spring assembly 38 can be an over-center spring assembly 38, thereby providing force exerted upon the spool 42 in two different directions. By way of example only, the spring assembly 38 illustrated in FIGS. 2-5 has two levers 48 coupled to a spring 50 and the piston rod 36, and has two stable positions separated by an unstable intermediate position. Further details regarding this spring assembly 38 are provided in U.S. Pat. No. 5,505,593 issued to Hartley et al.

When the piston rod 36 in the illustrated embodiment moves in a downward direction as described above (i.e., from the first position illustrated in FIG. 4 toward the second position illustrated in FIG. 5), the spring assembly 38 can be switched, such as by the stop 54 on the piston rod 36. In this manner, the spring assembly 38 can exert a force upon the piston rod 36 to at least assist in moving the piston rod 36 in a downward direction and to thereby move the spool 42.

When the piston rod 36 in the illustrated embodiment moves in an upward direction as also described above (i.e., from the second position illustrated in FIG. 5 toward the first position illustrated in FIG. 4), the spring assembly 38 can be switched, such as by the stop 44 on or coupled to either or both pistons 20, 22. In this manner, the spring assembly 38 can exert a force upon the piston rod 36 to at least assist in moving the piston rod 36 in an upward direction and to thereby move the spool 42.

In other embodiments, other types of connections between the pistons 20, 22 and the piston rod 36 are possible, some of which are lost motion connections, and some of which utilize other types of stops 44 on the piston rod 36 and/or pistons 20, 22. Also, in the illustrated embodiment of FIGS. 1-9, the piston rod 36 is coupled to and moves the spool 42 via two stops 46, 54 as described above. However, in other embodiments, the piston rod 36 can be coupled to and move the spool 42 in other manners, such as by other types of stops 46, 54 located in the same or different positions on the piston rod 36 and/or the spool 42.

With reference now to FIG. 3 of the illustrated embodiment, the spool valve 34 comprises a sleeve 40 and a spool 42 as described above. The sleeve 40 comprises a number of rings 56 through which the spool 42 moves to the different positions described above.

The sleeve 40 illustrated in FIGS. 2-6 can have any length and thickness desired, depending at least in part upon the size of the spool 42 received within the sleeve 40. In the illustrated embodiment, for example, the sleeve 40 has a substantially elongated shape, although other sleeve shapes are possible.

With continued reference to FIGS. 2-6, the sleeve 40 has a generally round cross-sectional shape defined by rings 56 having an annular shape. In other embodiments, the sleeve 40 can have any other cross-sectional shape, including without limitation oval, polygonal, irregular, and other cross-sectional shapes. Each ring 56 can have any cross-sectional shape (with reference to the cross-sectional shape of the rings 56 illustrated in FIGS. 4-6), including without limitation round, oval, polygonal, irregular, and other cross-sectional shapes.

The sleeve 40 illustrated in FIGS. 2-6 comprises four stacked rings 56. In other embodiments, the sleeve 40 can have any other number of rings 56 (including a single ring 56 having any of the features described and illustrated herein). In those embodiments having two or more rings 56, the rings 56 can be identical to one another, thereby enabling the assembly of sleeves 40 having different lengths using a common ring type. In other embodiments, the sleeve 40 can comprise any number of rings 56 having any number of different shapes.

In some embodiments, the sleeve 40 is received within a valve chamber 58 of the housing 24. One or more seals 60 can be located between the sleeve 40 and the housing 24, thereby preventing fluid leakage between the sleeve 40 and the housing 24. Any number of seals 60 can be used for this purpose. For example, each ring 56 in the illustrated embodiment has a corresponding seal 60 located between the ring 56 and the housing 24. Alternatively, each ring 56 could instead have two or more corresponding seals 60. In other embodiments, less than all of the rings 56 are provided with a corresponding seal 60.

Any type of seal 60 can be used to prevent fluid leakage between the sleeve 40 and the housing 24. In the illustrated embodiment for example, O-ring seals 60 are located on and carried by the sleeve 40. Each seal 60 can be retained on a corresponding ring 56 by a recess and/or by one or more protrusions of the ring 56. The rings 56 illustrated in FIGS. 2-7 each have a circumferential groove 62 in which an O-ring seal 60 is received. Alternatively, the seals 60 can be retained in place on the rings 56 by one or more ribs, bumps, pins, or other elements on the rings 56. If desired, the sleeve 40 can have one or more seals 60 each carried by the sleeve 40 at an interface between adjacent rings 56. In such cases, fluid can flow through the sleeve 40 (described in greater detail below) in other locations.

One or more rings 56 can have at least one protrusion 64 extending toward an adjacent ring 56. In some embodiments, one or more rings 56 have multiple protrusions 64 extending toward an adjacent ring 56, in which case the protrusions 64 can be equally or unequally spaced on each ring 56. Also, the sleeve 40 can have at least one ring 56 having one or more protrusions 64 on each side of the ring 56, such as a ring 56 having two or more equally or unequally spaced protrusions 64 on each side of the ring 56.

Figure 10:
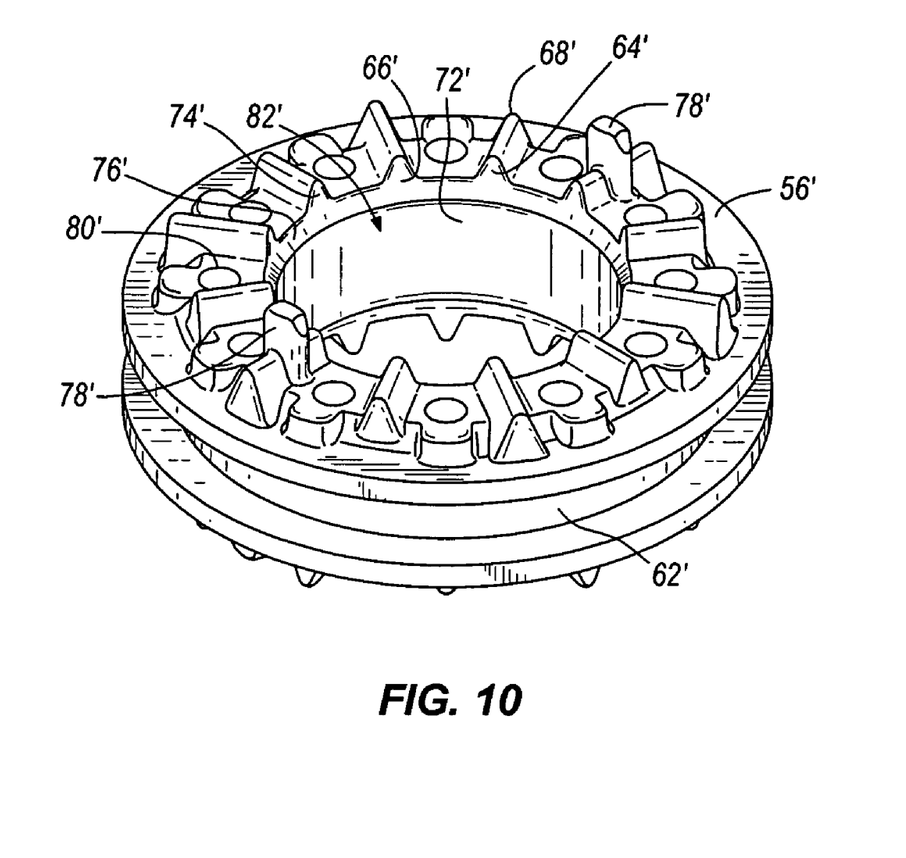
FIG. 10 is a perspective view of an alternative embodiment of the ring of the spool valve illustrated in FIGS. 2-6.

The protrusion(s) 64 can have any shape desired, including without limitation post-shaped protrusions, bumps, and the like. In some embodiments, the protrusions 64 can each have a base 66 and a tip 68 having a smaller cross-sectional area than the base 66. For example, the protrusions 64 in the illustrated embodiment are generally triangular in shape, and can have planar sides (as shown) or can be generally conical or frusto-conical. Regardless of the shape of the protrusions 64, any or all of the protrusions 64 can have sharp, chamfered, or curved edges and corners. Still other protrusion shapes are possible, and fall within the spirit and scope of the present invention. For example, the ring 56' illustrated in FIG. 10 has protrusions 64' that are radially longer than those illustrated in FIG. 7, and can provide additional stiffness and structural support for the sleeve 40. The protrusions 64, 64' can have any radial and/or circumferential dimension desired. Further stiffness and strength can also be obtained by changing the shape of the ring 56', such as by increasing the radial thickness of the ring 56' (e.g., see the radially outwardly-extending pads between adjacent protrusions 64 illustrated in FIG. 10).

Figure 4:
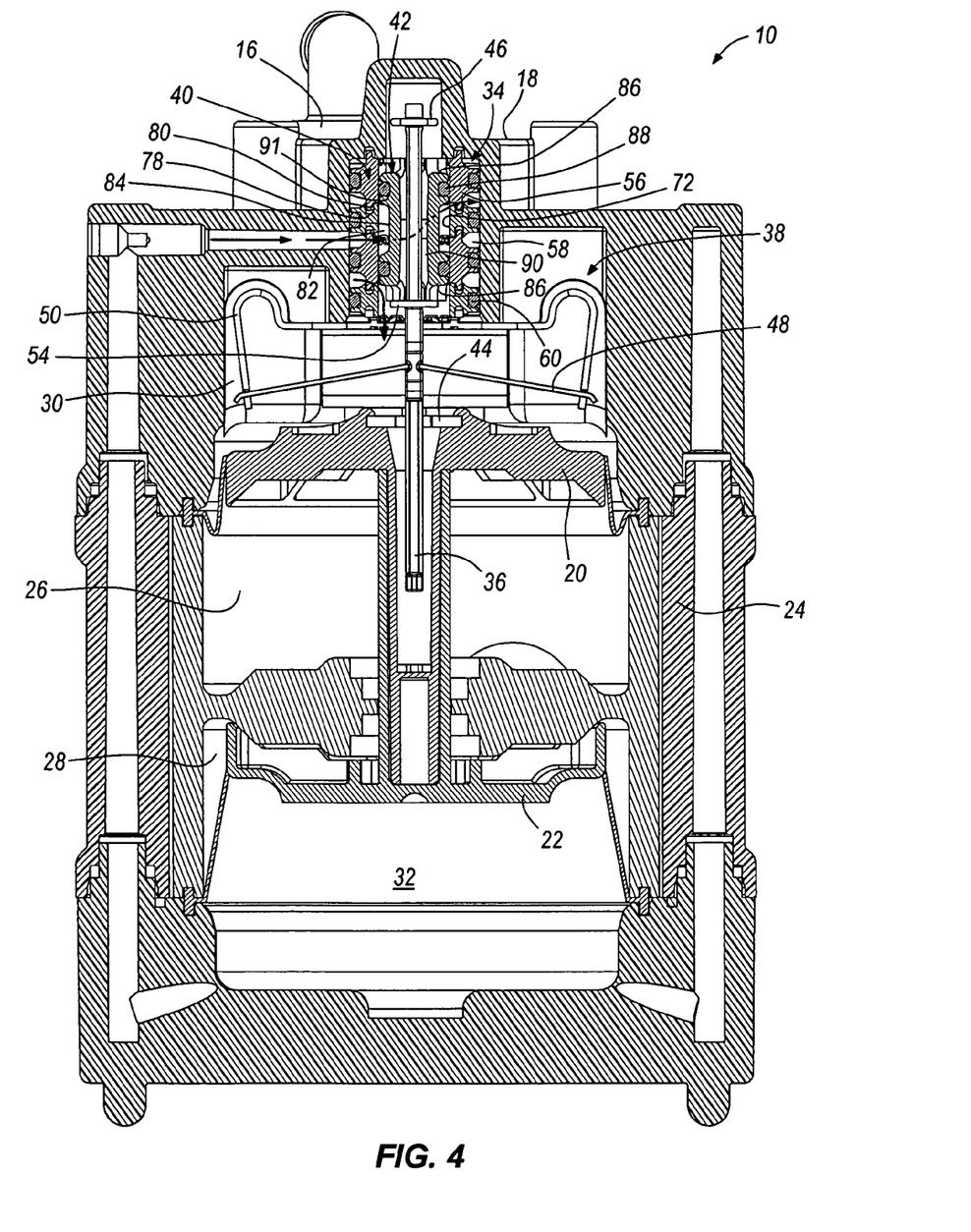
FIG. 4 is an elevational detail view of the pump illustrated in FIGS. 1-3, shown with the pump in a first state.
Figure 5:
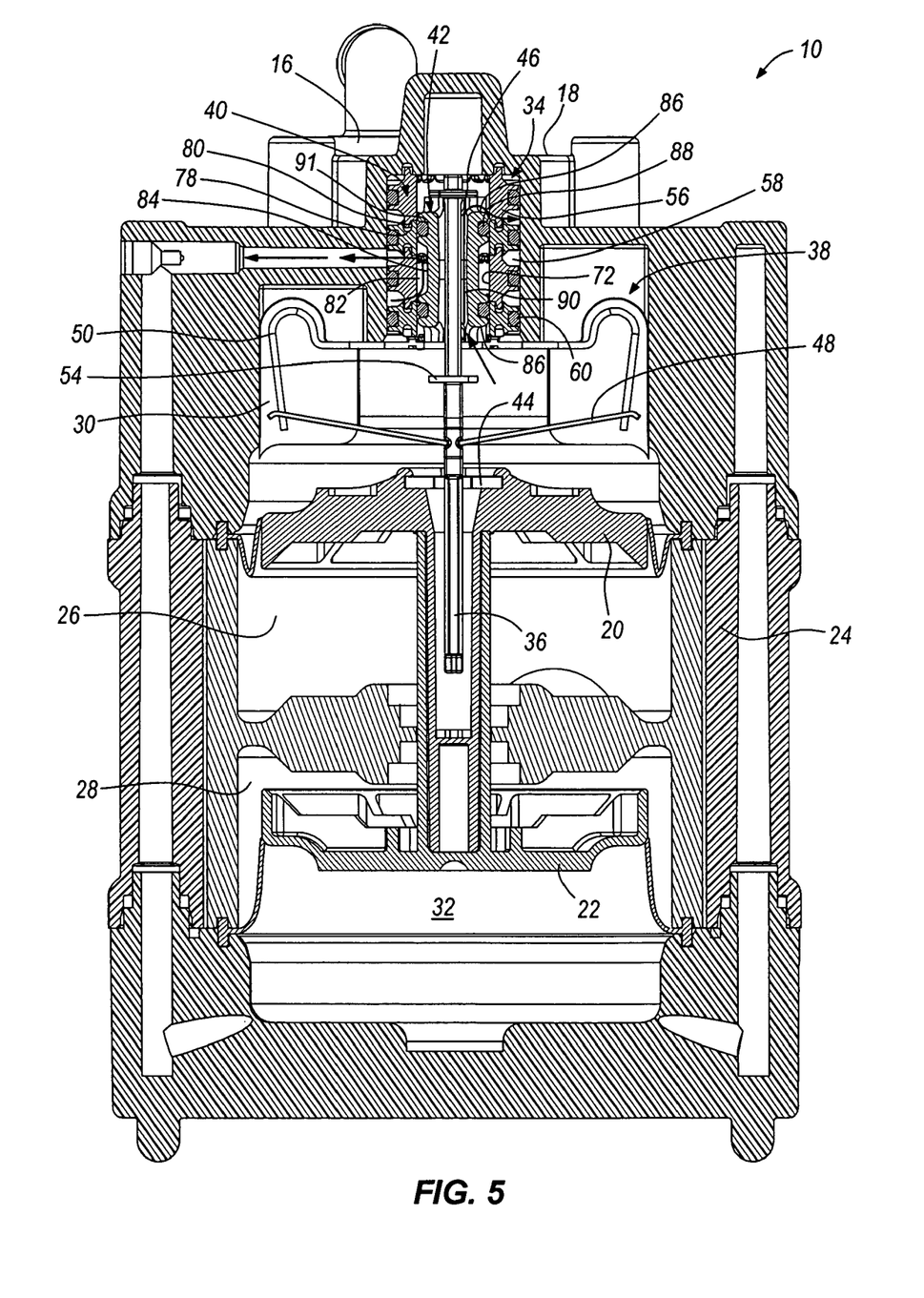
FIG. 5 is an elevational detail view of the pump illustrated in FIGS. 1 and 2, shown with the pump in a second state.
Figure 6:
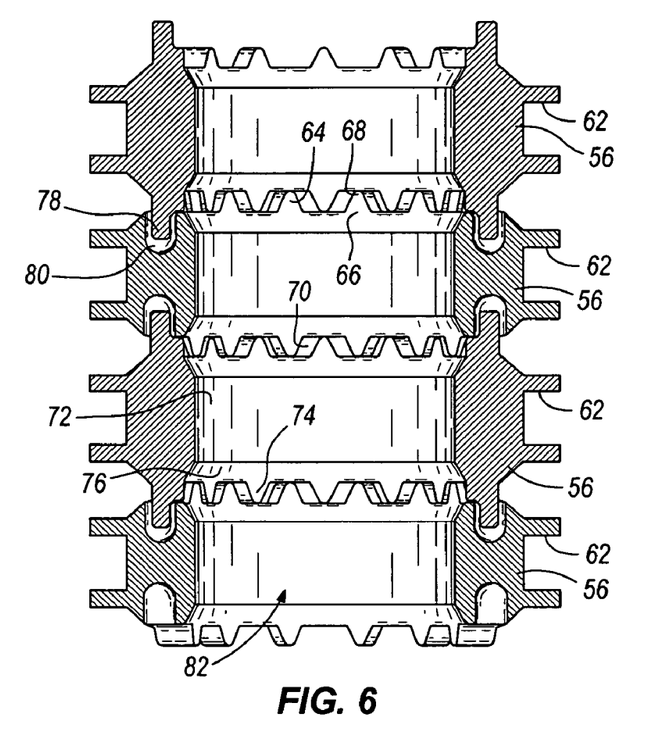
FIG. 6 is an elevational cross-sectional view of the sleeve illustrated in FIGS. 2-5.

With reference to FIGS. 4-6, each ring 56 has protrusions 64 extending toward an adjacent ring 56 in the stack of rings 56. These protrusions 64 thereby maintain a desired positional relationship between adjacent rings 56, and can define spaces 70 (see FIG. 7) between adjacent rings 56 through which fluid can pass into and/or out of the sleeve 40 in one or more states of the spool valve 34 as will be described in greater detail below. Also, protrusions 64 on the rings 56 at the opposite ends of the sleeve 40 can maintain a desired positional relationship between these rings 56 and the housing 24 or other adjacent pump components (such as the spring 50). The protrusions 64 on the rings 56 at the opposite ends of the sleeve 40 can also define additional spaces 70 between the rings 56 and the housing 24 or other adjacent pump components through which fluid can pass into and/or out of the sleeve 40 in one or more states of the spool valve 34.

In some embodiments, adjacent rings 56 of the sleeve 40 have protrusions 64 extending toward one another. The protrusions 64 on each such ring 56 can be equally or unequally spaced sufficiently to receive the protrusions 64 of the adjacent ring 56 while still defining the spaces 70 between the rings 56 as described above. In other embodiments, spaces 70 can still be defined between adjacent rings 56 in which only one of the adjacent rings 56 has equally or unequally spaced protrusions 64 extending toward the other of the adjacent rings 56.

Each of the rings 56 in the illustrated embodiment has substantially symmetrical oppositely facing sides. However, in other embodiments, one or more of the rings 56 need not necessarily have this symmetry (e.g., rings 56 having protrusions 64 on only one side, rings having different numbers and/or arrangements of protrusions 64 on opposite sides, and the like).

Figure 7:
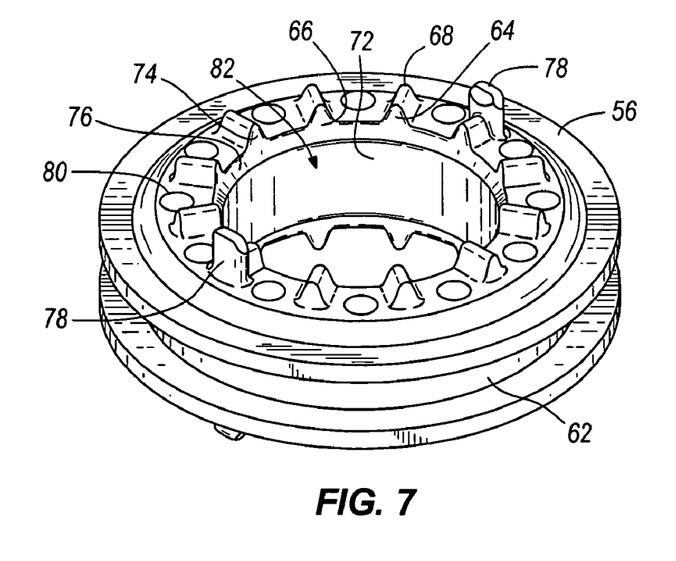
FIG. 7 is a perspective view of a ring of the spool valve illustrated in FIGS. 2-6.

As best shown in FIG. 7, the protrusions 64 in the illustrated embodiment are located on each ring 56 adjacent a radially inner cylindrical surface 72 thereof. Accordingly, when two rings 56 are stacked upon one another, the protrusions 64 of each ring 56 have radially inner surfaces 74 that each function as a bridge across to the adjacent ring 56. In some embodiments, the radially inner surfaces 74 of the protrusions 64 on each ring 56 are recessed with respect to the radially inner cylindrical surface 72 of the ring 56. In other words, the radially inner surfaces 74 of the protrusions 64 on each ring 56 have a larger radius than the radially inner cylindrical surface 72 of the ring 56. If desired, the radially inner surfaces 74 of the protrusions 64 of each ring 56 can be joined to the radially inner cylindrical surface 72 of each ring 56 by a chamfered surface 76 having a flat, concave, or convex profile. In the illustrated embodiment, for example, the radially inner surfaces 74 of the protrusions 64 of each ring 56 are joined to the radially inner cylindrical surface 72 of each ring 56 by a chamfered surface 76 having a flat profile. As will be described in greater detail below, the use of radially recessed protrusions 64 and chamfered inner ring surfaces 76 can reduce frictional forces that can develop between the spool 42 and the sleeve 40 under some operating conditions.

In other embodiments, the radially inner surfaces 74 of the protrusions 64 on each ring 56 are substantially flush with the radially inner cylindrical surface 72 of the ring 56. In other words, the protrusions 64 are located immediately adjacent the inner cylindrical surface 72 of the ring 56. In still other embodiments, the radially inner surfaces 74 of the protrusions 64 on each ring 56 have a slightly smaller radius than that of the radially inner cylindrical surface 72 of each ring 56. In such embodiments, the protrusions 64 can resist movement of the spool 42 (and therefore, a change in valve state) to a desired level of force upon the spool 42.

With reference to FIGS. 2-7, in some embodiments two or more rings 56 of the sleeve 40 are connected together using one or more fasteners. In the illustrated embodiment, each ring 56 has a pair of axially-extending pins 78 that can be received within corresponding apertures 80 in an adjacent ring 56. Each ring 56 can have any number of pins 78 (e.g., one pin or three or more pins) and any number of apertures 80 for this purpose. Also, the pins 78 and apertures 80 can have any location on the rings 56, such as at one or more diametrically opposed locations on the rings 56, at a series of equally or unequally-spaced locations on the rings 56, and the like. In the illustrated embodiment, for example, the pins 78 on a side of a ring 56 can be received within any two of a number of different equally-spaced apertures 80 in an adjacent ring 56, thereby enabling adjacent rings 56 to be connected together in two or more different relative rotational positions. In some embodiments, the pin(s) 78 and aperture(s) 80 can be located so that adjacent rings 56 can only be connected in a single relative orientation, or in two or more specific relative orientations. It will be appreciated that those embodiments having different numbers, arrangements, and ratios of pins 78 and apertures 80 can have similar capabilities, if desired.

The pin and aperture engagement of the rings 56 in the illustrated embodiment can be substantially tight (e.g., an interference fit) to prevent inadvertent separation of adjacent rings 56, and can be permanent or releasable based at least in part upon the degree of interference between the pins 78 and apertures 80. In other embodiments, the pins 78 are received within the apertures 80 via a clearance fit, in which case the pin and aperture engagement does not necessarily resist relative axial movement between adjacent rings 56, but can still resist relative rotational movement between adjacent rings 56.

As an alternative to the pins 78 and apertures 80 described above, other types of fasteners and fastening methods can be utilized to permanently or releasably connect adjacent rings 56 together, all of which fall within the spirit and scope of the present invention. For example, adjacent rings 56 can be connected by inter-engaging annular and/or radial ribs and recesses, one or more clips, adhesive or cohesive bonding material, soldering, brazing, or welding, and the like.

The description above regarding the types of connections between adjacent rings 56 of the sleeve 40 applies equally to the manners in which the rings 56 at the opposite ends of the sleeve 40 can be permanently or releasably connected to the housing 24 or other pump components (e.g., the spring 50 as shown in FIGS. 4 and 5). The rings 56 at the opposite ends of the sleeve 40 can be permanently or releasably coupled to the housing 24 or other pump components by pins 78 on such rings 56 received within apertures 80 in the housing 24 or other pump components 78 (or vice versa), or in any of the other manners described above with reference to connections between adjacent rings 56.

As described above, the spool valve 34 comprises a sleeve 40 and a spool 42 movable within the sleeve 40 to different positions corresponding to different states of the spool valve 34. The spool 42 can have any shape and size in which the spool 42 can be received and is movable within the sleeve 40. In some embodiments, the spool 42 has a generally round cross-sectional shape, although any other spool cross-sectional shape is possible, including without limitation oval, polygonal, irregular, and other cross-sectional shapes. The spool 42 can have a cross-sectional shape substantially matching the cross-sectional shape of the sleeve 40, although such correspondence is not required.

The spool 42 is shaped to define at least one chamber 82 between the spool valve 34 and the sleeve 40 through which fluid flows. The spool 42 can have any shape in which such a chamber 82 (or chambers 82) is defined. In the illustrated embodiment, for example, the spool 42 has a generally elongated shape having a middle portion 84 with a reduced cross-sectional area. Accordingly, an annular chamber 82 is defined between the middle portion 84 of the spool 42 and the sleeve 40. Depending at least partially upon the relative shapes of the spool 42 and sleeve 40, the chamber 82 need not necessarily be annular, and can have any other shape desired. Also, two or more chambers 82 can be defined at different circumferential locations about the spool 42 (e.g., in embodiments in which the spool 42 and sleeve 40 have different cross-sectional shapes) and/or can be defined at different locations along the length of the spool 40 (e.g., a spool 42 with two or more portions having a reduced cross-sectional area separated in some embodiments by respective seals).

The spool 42 in the illustrated embodiment also has enlarged ends 86 defining the ends of the chamber 82. One or more seals 88 can be located between the spool 42 and the sleeve 40, thereby preventing fluid leakage from the chamber 82 past either or both ends of the spool 42. Any number of seals 88 can be used for this purpose. For example, each end 86 of the spool 42 in the illustrated embodiment has a corresponding seal 88 located between the spool 42 and the sleeve 40. Alternatively, each end 86 of the spool 42 could instead have two or more corresponding seals 88.

Any type of seal 88 can be used to prevent fluid leakage from the chamber 82 past either or both ends 86 of the spool 42. In the illustrated embodiment for example, O-ring seals 88 are located on and carried by the spool 42. Each seal 88 can be retained on a corresponding end 86 of the spool 42 by a recess and/or by one or more protrusions of the spool 42. The spool 42 illustrated in FIGS. 2-6 and 8 has circumferential grooves 91 in which O-ring seals 88 are received. Alternatively, the seals 88 can be retained in place on the spool 42 by one or more ribs, bumps, pins, or other elements on the spool 42.

In some embodiments, the spool 42 has an internal aperture 90 through which fluid can move during operation of the pump 10. This aperture 90 can extend axially along any length of the spool 42. For example, the aperture 90 can extend through the entire length of the spool 42 in order to permit fluid to move axially through the spool 42 in at least one state of the spool valve 34. In other embodiments, the aperture 90 can extend partially along the length of the spool 42, in which case the aperture 90 can also extend radially to the exterior of the spool 42 at one or more axial locations of the spool 34 (such as, for example, to one or more chambers 82 described above).

Figure 8:
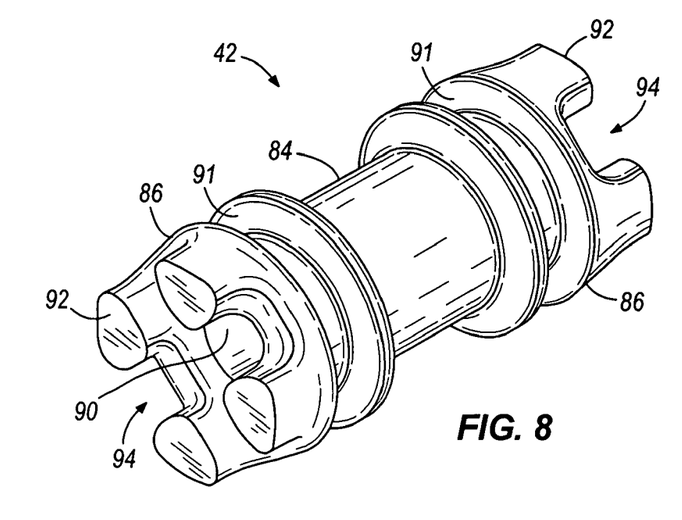
FIG. 8 is a perspective view of the spool illustrated in FIGS. 2-5.

With reference to FIG. 8, in some embodiments either or both ends of the spool 42 can have axial projections 92 defining radially-extending apertures 94 through which fluid can enter and/or exit the spool 42 in radial directions. Any number of axial projections 92 having any shape desired can be utilized for this purpose. Accordingly, the spool 42 can be shaped to allow fluid to enter and/or exit the spool 42 in radial and/or axial directions on either or both ends of the spool 42, depending at least in part upon the locations at which fluid is ported to and from the spool valve 34.

Figure 9:
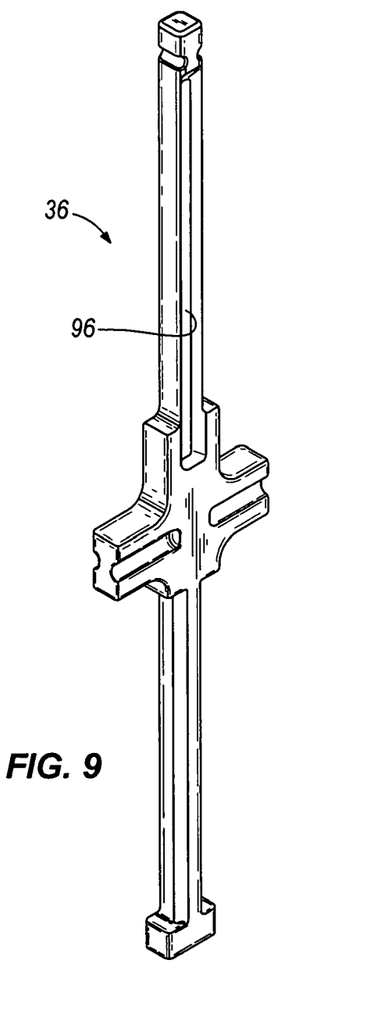
FIG. 9 is a perspective view of the piston rod illustrated in FIGS. 2-5.

In some embodiments, the piston rod 36 can be shaped to increase fluid flow through the internal aperture 90 of the spool 42. As shown in FIG. 9, the piston rod 36 can have at least one axially-extending groove 96 along which fluid can flow. The piston rod 36 can have any number of such grooves 96, such as grooves 96 on opposite sides of the piston rod 36. Also, the groove(s) 96 can extend along any part or all of the piston rod 36.

In operation, the spool 42 can be moved to different axial positions with respect to the sleeve 40 in order to change the state of the spool valve 34 (i.e., in order to change at least one location at which fluid is ported to or from the spool valve 34). The locations at which fluid enters and exits the spool valve 34 illustrated in FIGS. 2-9 represents only one possible configuration of the spool valve 34. Other locations at which driving and/or driven fluid can be supplied to and exhausted from the spool valve 34 are possible. In this regard, the spool valve 34 illustrated in FIGS. 2-9 is configured as described above. However, in other embodiments, the spool valve 34 can instead be configured as a different type of valve depending at least in part upon the number and locations of connections to fluid supply and exhaust lines. Fluid can be supplied to and/or exhausted from the valve 34 between any pair of adjacent rings 56 and radially or axially out either end 86 of the spool valve 34, and can be supplied to and/or exhausted from the valve 34 in any combination of such locations desired. Accordingly, the following description of operation of the spool valve 34 illustrated in FIGS. 2-9 is presented by way of example only.

By moving the spool 42 in the illustrated embodiment to different axial positions with respect to the sleeve 40, the seals 88 on the spool 42 are moved to different locations within the sleeve 40. Therefore, fluid supplied to the spool valve 34 at a location between adjacent rings 56 as shown in FIGS. 4 and 5 flows out of the chamber 82 between different pairs of adjacent rings 56 depending upon the axial position of the spool 42 and seals 88. Driving gas under pressure (e.g., from the gas inlet 16) is supplied to the spool valve 34 through spaces 70 between adjacent rings 56 when the valve 34 is in the state illustrated in FIG. 5. In this state, the driving gas under pressure exits the chamber 82 through other spaces in adjacent rings 56 as shown by the left arrows at the top of FIG. 5, and is directed to the second driving chamber 32 in order to drive the second piston 22 as described above. Meanwhile, gas is driven from the first driving chamber 30 through the internal aperture 90 of the spool 42, through the spaces 70 between another pair of adjacent rings 56, and to the gas outlet 18 as described above.

The pistons 20, 22 in the illustrated embodiment eventually travel upward (as viewed in the orientation of FIGS. 1-6) until the stop 44 pushes the piston rod 36 upward, thereby moving the spring assembly 38 over the center position of the spring assembly 38. The spring assembly 38 then forces the stop 54 on the piston rod 36 against an end surface of the spool 42, such as against end surfaces of the axial projections 92 at the bottom end 86 of the spool 42. In this manner, the spool 42 moves in an upward direction axially through the sleeve 40. Movement of the spool 42 in this direction can be limited in any suitable manner, such as by an outer periphery of the top spool end 86 (e.g., the radially outer end surfaces of the axial projections 92) abutting a surface of the housing 24 as shown in FIG. 4.

Movement of the spool 42 in the upward direction just described causes the seals 88 on the spool 42 to move from one ring 56 to an adjacent ring 56 across the radially inner surfaces 74 of the protrusions 64 extending from the rings 56. When this transition is made, the seals 88 cross and are supported by the protrusions 64 of the rings 56. In the illustrated embodiment, the seals 88 also cross the chamfered inner ring surfaces 76 described above. In addition, the protrusions 64 of the rings 56 are radially recessed as also described above. These features enable the seals 88 to cross from one ring 56 to another with reduced friction while still being supported by the protrusions 64 against becoming trapped between adjacent rings 56, such as by a pressure differential that can exist in some embodiments on opposite sides of one or more seals 88 (e.g., in embodiments in which fluid is supplied to or exhausted from the chamber 72 through the spaces 70 between adjacent rings 56).

When the spool 42 is in the position illustrated in FIG. 4, driving gas under pressure (e.g., from the gas inlet 16) is supplied to the spool valve 34 through the spaces 70 between adjacent rings 56 as described above. However, the driving gas is blocked from flowing into the chamber 82, and is instead directed to the first driving chamber 30 in order to drive the first piston 20 as also described above. Meanwhile, gas is driven from the second driving chamber 32, through the spaces 70 between adjacent rings 56, into the chamber 82, and out to the gas outlet 18 through spaces 70 between another pair of adjacent rings 56.

The pistons 20, 22 in the illustrated embodiment travel downward under pressure from the gas filling the first driving chamber 30 until the stop 44 pushes the piston rod 36 downward, thereby moving the spring assembly 38 back over the center position of the spring assembly 38. The spring assembly 38 then forces the stop 46 on the piston rod 36 against an end surface of the spool 42, such as against end surfaces of the axial projections 92 at the top end 86 of the spool 42. In this manner, the spool 42 moves in a downward direction axially through the sleeve 40 back to the spool position illustrated in FIG. 5 and described above. Movement of the spool 42 in this direction can be limited in any suitable manner, such as by an outer periphery of the bottom spool end 86 (e.g., the radially outer end surfaces of the axial projections 92) abutting the spring 50 as shown in FIG. 5.

Movement of the spool 42 in the downward direction as just described causes the seals 88 on the spool 42 to again move from one ring 56 to an adjacent ring 56 across the radially inner surfaces 74 of the protrusions 64 extending from the rings 56. During this transition, the seals 88 are supported in substantially the same manner as described above with reference to the transition of the seals 88 in the upward movement of the spool 42.

The embodiments described above and illustrated in the drawings are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, the gas-operated pump 10 illustrated in FIGS. 1-5 and described above is only one type of device in which the spool valve 34 can be utilized. The spool valve 34 can instead be utilized in a pump driven by any other working fluid (e.g., hydraulic driving force rather than pneumatic driving force), in any other type of pump (e.g., a pump having only a single piston, pumps having different fluid driving elements, and the like), and in any other type of device.

As another example, the spool 42 described above and illustrated in the accompanying figures is moved to different positions with respect to a stationary sleeve 40. In other embodiments, the spool 42 can instead be stationary while the sleeve 40 is actuated to different relative positions in order to accomplish similar fluid porting functions. In still other embodiments, both the spool 42 and sleeve 40 can be actuated to different positions with respect to one another for such purposes.

In the illustrated embodiment described above, the seals 88 are carried to different positions by the spool 42. In other embodiments, however, the seals 88 can be carried by the sleeve 40 (e.g., upon inner surfaces of one or more rings 56 in any of the manners described above regarding seal retention upon the rings 56 and spool 42). In such embodiments, the spool 42 can still be moved to different axial positions within the sleeve 42 in order to change the location(s) at which fluid enters and/or exits the chamber 82.

What is claimed is:

1. A spool valve in a housing including at least one first aperture, the spool valve comprising:
   at least two rings through which an axis passes, each one of the at least two rings including symmetrical oppositely facing sides and a first radial inner surface, a first one of the at least two rings comprising a plurality of projections extending toward a second one of the at least two rings, the plurality of projections including a second radial inner surface that has a greater radius than the first radial inner surface;
   the first one of the at least two rings including at least one first pin on a first oppositely facing side that engages the at least one first aperture of the housing in order to couple the first one of the at least two rings to the housing, and at least one second pin on a second oppositely facing side that engages at least one second aperture of the second one of the at least two rings in order to couple the at least two rings together;
   a spool movable along the axis, the spool including a first end and a second end, the spool including an internal aperture along the axis, the spool having a first position in which fluid moves through the valve in a first manner; and a second position in which fluid moves through the valve in a second manner different than the first manner; friction between the spool and the at least two rings being reduced when the spool passes through the at least two rings due to the second radial inner surface having the greater radius than the first radial inner surface;
   a piston rod at least partly positioned in the internal aperture of the spool, the piston rod movable with respect to the spool along the axis, the piston rod including a first stop and a second stop, the first stop engaging and disengaging with the first end of the spool, the second stop engaging and disengaging with the second end of the spool; and
   a chamber located between the spool and at least one of the at least two rings.

2. The spool valve as claimed in claim 1, wherein the chamber extends at least partially about the spool.

3. The spool valve as claimed in claim 2, further comprising first and second seals on the spool, wherein the chamber is located axially between the first and second seals.

4. The spool valve as claimed in claim 3, wherein the first and second seals are slidable across surfaces of the at least two rings and across an interface between the at least two rings in movement of the spool between the first and second positions.

5. The spool valve as claimed in claim 1, wherein the plurality of projections of at least one of the at least two rings has a base and a tip having a smaller cross-sectional area than the base.

6. The spool valve as claimed in claim 1, wherein the plurality of projections of at least one of the at least two rings has at least one of curved and chamfered edges and corners.

7. The spool valve as claimed in claim 1, further comprising at least one third aperture defined in the first one of the at least two rings positioned between at least two adjacent projections of the plurality of projections of the first one of the at least two rings; and further comprising at least one additional pin on the second one of the at least two rings; wherein the at least two rings are further coupled by the at least one additional pin on the second one of the at least two rings received and engaged within the at least one third aperture in the first one of the at least two rings.

8. The spool valve as claimed in claim 1, further comprising an annular seal on the spool.

9. The spool valve as claimed in claim 8, wherein the annular seal is slidable across a surface of a first ring, the plurality of projections of the at least two rings, and a surface of a second ring in movement of the spool from the first position to the second position.

10. The spool valve as claimed in claim 1, wherein the at least two rings are substantially identical.

11. The spool valve as claimed in claim 1, further comprising at least one projection extending axially from an end of the spool and past which fluid passes in a radial direction from the spool.

12. The spool valve as claimed in claim 1, further comprising an aperture defined through an end of the spool permitting fluid passage radially through the end of the spool.

* * * * *